(12) United States Patent
Shibata

(10) Patent No.: US 8,934,829 B2
(45) Date of Patent: Jan. 13, 2015

(54) DOCUMENT COVER, IMAGE READER HAVING DOCUMENT COVER, AND IMAGE FORMING APPARATUS

(71) Applicant: KYOCERA Document Solutions Inc., Osaka-shi, Osaka (JP)

(72) Inventor: Naoki Shibata, Osaka (JP)

(73) Assignee: Kyocera Document Solutions Inc. (JP)

( * ) Notice: Subject to any disclaimer, the term of this patent is extended or adjusted under 35 U.S.C. 154(b) by 201 days.

(21) Appl. No.: 13/671,618

(22) Filed: Nov. 8, 2012

(65) Prior Publication Data

US 2013/0121741 A1 May 16, 2013

(30) Foreign Application Priority Data

Nov. 16, 2011 (JP) ................. 2011-250685

(51) Int. Cl.
*G03G 15/00* (2006.01)
*H04N 1/00* (2006.01)
*G03B 27/62* (2006.01)
*H04N 1/10* (2006.01)

(52) U.S. Cl.
CPC ......... *G03G 15/605* (2013.01); *H04N 1/00551* (2013.01); *H04N 1/00554* (2013.01); *H04N 1/1013* (2013.01); *G03G 2221/1687* (2013.01); *H04N 2201/0422* (2013.01); *H04N 2201/0434* (2013.01); *H04N 2201/0446* (2013.01); *H04N 2201/0456* (2013.01); *H04N 2201/0094* (2013.01)
USPC ....................................................... 399/362

(58) Field of Classification Search
CPC .................................................... G03B 27/62

USPC ......................................................... 399/362
See application file for complete search history.

(56) References Cited

U.S. PATENT DOCUMENTS

| 6,363,576 | B1 * | 4/2002 | Hsu et al. ................. 16/239 |
| 8,683,649 | B2 * | 4/2014 | Tzeng ........................ 16/50 |
| 2003/0231363 | A1 * | 12/2003 | Dowdy et al. ............ 358/506 |
| 2004/0174515 | A1 * | 9/2004 | Votipka et al. ............ 355/75 |
| 2004/0228082 | A1 * | 11/2004 | Tiao ........................ 361/683 |
| 2004/0263916 | A1 * | 12/2004 | Qian ......................... 358/474 |
| 2005/0025541 | A1 | 2/2005 | Terae et al. |

(Continued)

FOREIGN PATENT DOCUMENTS

| JP | 05-297665 | 11/1993 |
| JP | 06167838 A * | 6/1994 |

(Continued)

*Primary Examiner* — Nguyen Ha
(74) *Attorney, Agent, or Firm* — Gerald E. Hespos; Michael J. Porco; Matthew T. Hespos

(57) ABSTRACT

A document cover covers a document platen of a housing. The document cover has a cover frame, a document pressing part, and a hinge. The hinge has a first member and a second member. The first member has a rotating shaft and a first fixed part that is mounted on one of the cover frame and the housing. The second member has a fitted part that is fitted rotatably to the rotating shaft, and a second fixed part, which is mounted on the other of the cover frame and the housing. The first member and the second member can change states thereof between a first state in which the first member and the second member can be attached to or detached from each other, and a second state in which the first member and the second member are prevented from being detached from each other.

12 Claims, 17 Drawing Sheets

(56) References Cited

U.S. PATENT DOCUMENTS

| | | |
|---|---|---|
| 2005/0042006 A1* | 2/2005 | Qian et al. .................... 399/380 |
| 2006/0139677 A1* | 6/2006 | Bae et al. ..................... 358/1.13 |
| 2006/0268532 A1* | 11/2006 | Kwak ........................... 361/792 |
| 2007/0201109 A1* | 8/2007 | Osakabe et al. ............. 358/474 |
| 2008/0135716 A1 | 6/2008 | Yeh et al. |
| 2009/0274502 A1* | 11/2009 | Choi ............................. 399/380 |
| 2010/0014127 A1* | 1/2010 | Osakabe et al. ............. 358/497 |
| 2011/0072727 A1* | 3/2011 | Kumazawa ................... 49/358 |
| 2011/0176124 A1 | 7/2011 | Takata |
| 2012/0050826 A1* | 3/2012 | Iwata et al. ................... 358/498 |
| 2012/0201371 A1* | 8/2012 | Chen et al. ................... 379/434 |

FOREIGN PATENT DOCUMENTS

| | | | |
|---|---|---|---|
| JP | 7-20750 | | 4/1995 |
| JP | 2000231163 A | * | 8/2000 |
| JP | 2002209037 A | * | 7/2002 |
| JP | 2005338479 A | * | 12/2005 |
| JP | 2007226116 A | * | 9/2007 |
| JP | 2010028465 A | * | 2/2010 |
| JP | 2011205274 A | * | 10/2011 |

\* cited by examiner

DOCUMENT COVER, IMAGE READER HAVING DOCUMENT COVER, AND IMAGE FORMING APPARATUS

This application is based on Japanese Patent Application Serial No. 2011-250685 filed in Japan Patent Office on Nov. 16, 2011, the contents of which are hereby incorporated by reference.

BACKGROUND

The present disclosure relates to a document cover used for pressing a document on a document platen to read an image on the document, an image reader having the document cover, and an image forming apparatus.

The following technology has been known as a conventional document cover used for pressing a document on a document platen to read an image on the document. In this technology, an apparatus main body with a document carrying glass (document platen) is provided with a document cover (sheet document feeding device) for pressing a document from above such that the document cover is turnable. The document cover has a hinge. The hinge has a hinge shaft and a slide rail extending from the hinge shaft. The slide rail is inserted slidably into the apparatus main body having the document carrying glass. The document cover is supported so as to be able to turn around the hinge shaft with respect to the apparatus main body.

In the technology described above, a book document, thicker than a pile of sheets, is occasionally placed on the document carrying glass. FIG. 17 is a lateral cross-sectional diagram schematically showing the document cover used in this case. The document cover 300 is supported so as to be turnable with respect to a contact glass 225 (document platen), by fitting a hinge shaft 301 to a fitted part 401 disposed at an upper end of a slide rail 400. Once placing a thick book document B on the contact glass 225, a user presses down the near side (left-hand side in the diagram) of the document cover 300 so that light outside the machine does not enter the contact glass 225. As a result, the document cover 300 and the slide rail 400 form an acute angle therebetween. Then, the hinge shaft 301 and the fitted part 401 are positioned at a rotation angle different from the one obtained when a regular sheet is placed on the contact glass 255 in the document cover rotational direction. This can prevent the hinge shaft 301 from falling off the slide rail 400 (arrow D17).

The present disclosure was contrived in view of the problem described above and is capable of preventing disengagement of a component constituting a hinge of a document cover.

SUMMARY

A document cover according to one aspect of the present disclosure covers a document platen of a housing. The document cover has a cover frame, a document pressing part disposed in the cover frame, and a hinge. The hinge is disposed in the cover frame and supports the cover frame rotatably such that the document pressing part opens and closes with respect to the document platen. The hinge has a first member and a second member. The first member has a rotating shaft functioning as a rotating shaft center in the rotational motion, and a first fixed part that is mounted on the cover frame or the housing. The second member has a fitted part that is fitted rotatably to the rotating shaft, and a second fixed part, which is mounted on a side opposite the first fixed part, in the cover frame or the housing. The first member and the second member can change states thereof between a first state in which the first member and the second member can be attached to or detached from each other when neither the first fixed part nor the second fixed part is mounted on the cover frame, and a second state in which the first member and the second member are prevented from being detached from each other by fixing either the first fixed part or the second fixed part to the cover frame when the rotating shaft and the fitted part are fitted to each other.

An image reader according to another aspect of the present disclosure has a housing having a document platen, the document cover described above, and a reading part. The reading part reads an image on the document placed on the document platen.

An image forming apparatus according to another aspect of the present disclosure has a housing with a document platen, the document cover described above, a reading part, and an image forming part. The reading part reads an image on the document placed on the document platen. The image forming part forms an image in accordance with the image on the document that is read by the reading part.

DETAILED DESCRIPTION

Figure 1:
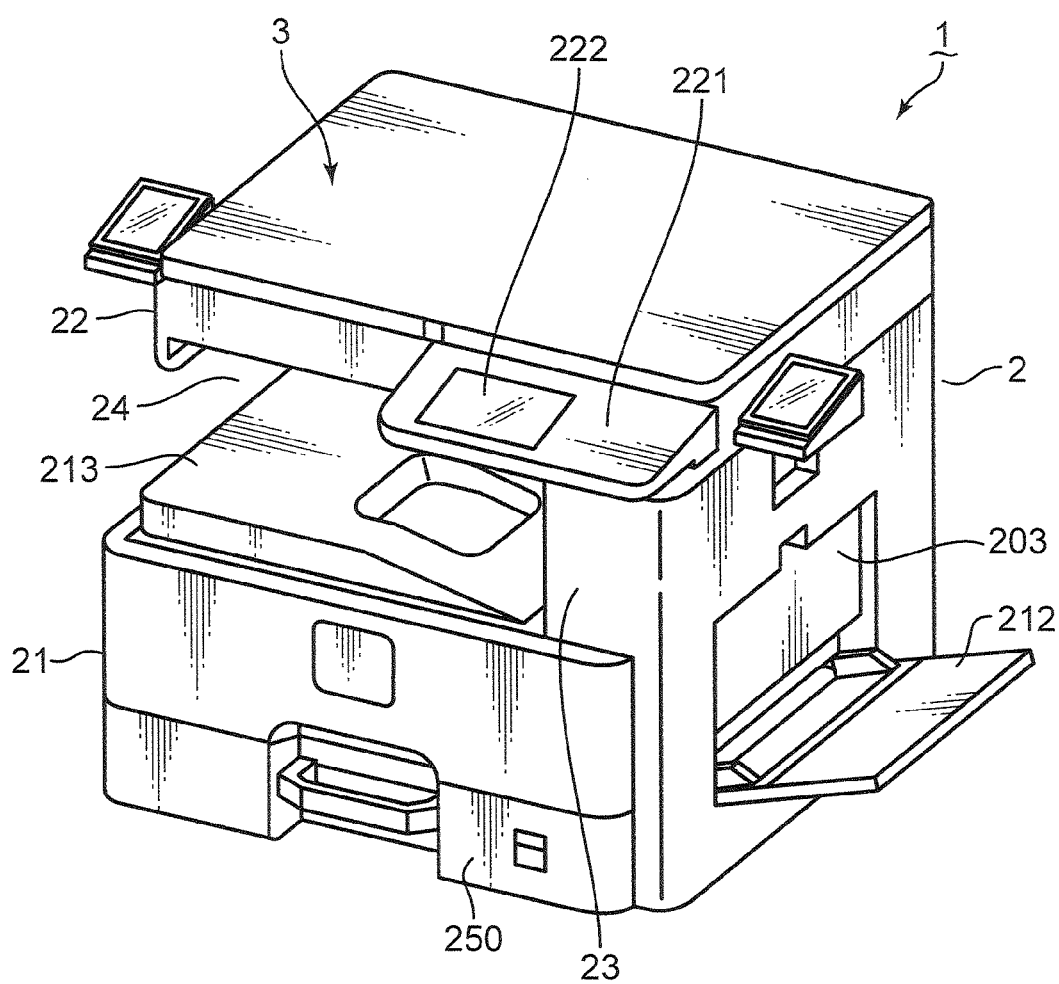
FIG. 1 is a perspective view of an image forming apparatus according to an embodiment of the present disclosure.
Figure 2:
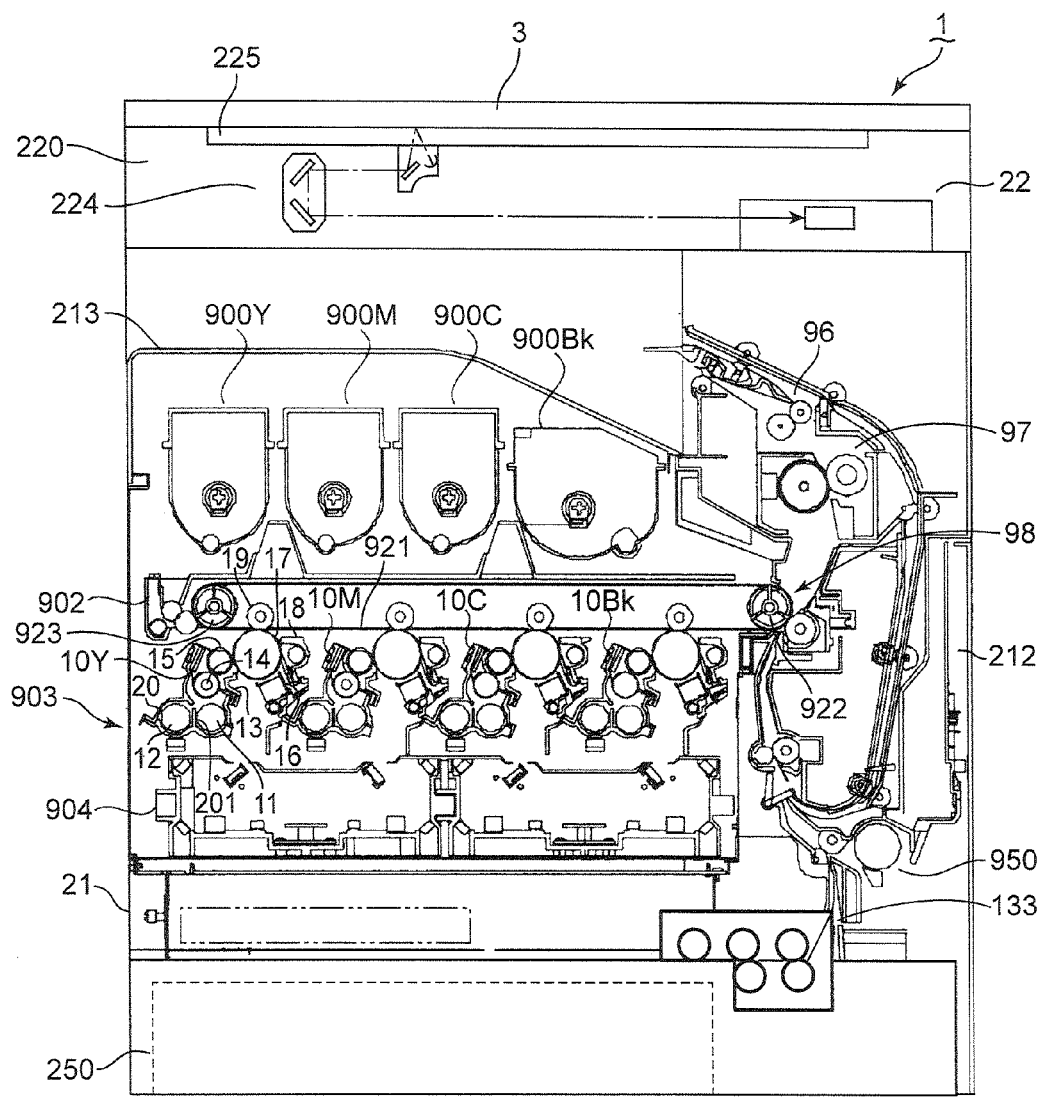
FIG. 2 is an internal cross-sectional diagram of the image forming apparatus according to the embodiment of the present disclosure.

An embodiment of the present disclosure is described hereinafter with reference to the drawings. FIG. 1 is a perspective view of an image forming apparatus according to an embodiment of the present disclosure. FIG. 2 is a diagram schematically showing an internal structure of the image forming apparatus shown in FIG. 1. The image forming apparatus shown in FIGS. 1 and 2 is a so-called in-body paper discharge type copier. In other embodiment, however, the image forming apparatus may be a printer, a facsimile device, a compound machine having these functions, or a device for forming a toner image on a sheet.

An image forming apparatus 1 includes a substantially cuboid main housing 2. The main housing 2 includes a substantially cuboid lower housing 21, a substantially cuboid upper housing 22 disposed above the lower housing 21, and a coupling housing 23 that couples the lower housing 21 and the upper housing 22 to each other. The coupling housing 23 extends along a right edge and rear edge of the main housing 2. Sheets that are subjected to a printing job are discharged to a discharge space 24 surrounded by the lower housing 21, the upper housing 22, and the coupling housing 23.

An operation part 221 that protrudes to the front of the upper housing 22 includes, for example, an LCD touch panel 222. The operation part 221 is formed such that information on an image forming process can be input thereto.

A document cover 3 disposed on the upper housing 22 is used for pressing a document. The document cover 3 is attached to the upper housing 22 so as to be able to turn vertically. A user turns the document cover upward with respect to a rear end of the document cover 3 as a supporting point, and places a document on the upper housing 22. The user then operates the operation part 221 to cause equipment disposed inside the upper housing 22 to read an image on the document. The document cover 3 according to the present embodiment is described hereinafter in detail.

A sheet tray 250 on which a plurality of sheets are stacked is disposed in the lower housing 21. The sheet tray 250 can be pulled to the front of the lower housing 21. A sheet P stored in the sheet tray 250 is fed upward in the lower housing 21, subjected to the image forming process in the lower housing 21 based on an instruction that is input by the user using the operation part 221, and discharged to the discharge space 24.

A tray 212 is attached to a right surface of the lower housing 21 so as to be able to turn. When the tray 212 protrudes to the right-hand side of the lower housing 21 as shown in FIG. 1, the user can place a sheet on the tray 212. The sheet on the tray 212 is drawn into the lower housing 21 based on an instruction that is input by the user using the operation part 221. Thereafter, the sheet is subjected to the image forming process and discharged to the discharge space 24. When the tray 212 is turned upward, the tray 212 is stored in a storage space 203 that is provided in a concave form on the right surface of the lower housing 21, thereby closing a supply port through which the sheet is drawn into the lower housing 21.

The lower housing 21 stores various equipment used for forming an image on a sheet. The coupling housing 23 stores various equipment used for discharging, to the discharge space 24, sheets that are subjected to the image forming process.

An image reader 220 including the document cover 3 is positioned in the upper housing 22. The image reader 220 has a scanning mechanism 224 (reading part). The user can cause the image reader 220 to read an image on a desired document by using the scanning mechanism 224. The contact glass 225 that is attached to an upper surface of the upper housing 22 is disposed on the scanning mechanism 224. The document cover 3 is used for pressing a document placed on the contact glass 225. When the user activates the image forming apparatus 1 by using the operation part 221, the scanning mechanism 224 scans and reads an image on the document placed on the contact glass 225.

Toner containers 900Y, 900M, 900C, and 900Bk, an intermediate transfer unit 902, image forming part 903, exposure unit 904, fixing unit 97, and sheet discharge unit 96 are stored in the lower housing 21.

The image forming part 903 includes the yellow toner container 900Y, magenta toner container 900M, cyan toner container 900C, and black toner container 900Bk. Developing devices 10Y, 10M, 10C, and 10Bk corresponding to the colors Y, M, C and Bk are disposed under the respective containers.

The image forming part 903 includes photosensitive drums that carry toner images of the respective colors. Yellow, magenta, cyan, and black toners are supplied from developing devices 10Y, 10M, 10C, and 10Bk to the photosensitive drums 17.

A charger 16, the developing device 10 (10Y, 10M, 10C, 10Bk), a transfer roller 19, and a cleaning device 18 are positioned around each photosensitive drum 17. The charger 16 charges a surface of the photosensitive drum 17 evenly. The charged surface of the photosensitive drum 17 is exposed by the exposure unit 904, whereby an electrostatic latent image is formed thereon. The exposure unit 904 emits a laser beam based on a digital signal generated by the scanning mechanism 224. Each of the developing devices 10Y, 10M, 10C, and 10Bk develops the electrostatic latent image (makes the electrostatic latent image visible) formed on the photosensitive drum 17, by using the toner supplied from the corresponding toner container 900Y, 900M, 900C, or 900Bk. The transfer roller 19 and the corresponding photosensitive drum 17 hold an intermediate transfer belt 921 therebetween to form a nip part. The transfer roller 19 then primarily transfers the toner image formed on the photosensitive drum 17 onto the intermediate transfer belt 921. The cleaning device 18 cleans a circumferential surface of the photosensitive drum 17 after the transfer of the toner image thereof.

Each of the developing devices 10Y, 10M, 10C, and 10Bk has a developing housing 20. Two-component developer with magnetic carrier and toner is stored in the developing housing 20. Two stirring rollers 11 and 12 are positioned rotatably inside the developing housing 20. The stirring rollers 11 and 12 are positioned parallel in a longitudinal direction, which is an axial direction, in the vicinity of a bottom part of the developing housing 20.

A developer circulation path is established in an inner bottom surface of the developing housing 20. The stirring rollers 11 and 12 are disposed inside the circulation path. A partition wall 201 standing upright on the bottom part of the developing housing 20 is provided in the axial direction between the stirring rollers 11 and 12. The partition wall 201 divides the circulation path. The circulation path is formed so as to revolve around the partition wall 201. The two-component developer is charged while being stirred and conveyed in the circulation path by the stirring rollers 11 and 12.

The two-component developer circulates in the developing housing 20 while being stirred by the stirring rollers 11 and 12. As a result, the toner is charged. A doctor blade 13 controls the thickness of a magnetic brush that supplies the toner to a developing roller 15 provided thereabove. A toner layer is formed on the developing roller 15 by the difference in potential between a magnetic roller 14 and the developing roller 15. The electrostatic latent image on each photosensitive drum 17 is developed by the toner image.

The exposure unit 904 emits light based on image data to the circumferential surface of each photosensitive drum 17, and forms the electrostatic latent image.

The intermediate transfer unit 902 has the intermediate transfer belt 921, a driving roller 922, and a driven roller 923. The toner images on the plurality of photosensitive drums 17 are applied to the intermediate transfer belt 921 (primary transfer). The toner images applied to the intermediate transfer belt 921 are secondarily transferred to a sheet supplied from the sheet tray 250 or tray 212 (see FIG. 1), in a secondary transfer part 98. The driving roller 922 and the driven roller 923, which are driven to cause the intermediate transfer belt 921 to revolve, are supported rotatably by the lower housing 21.

The fixing unit 97 performs a fixing process on the toner images that are secondarily transferred from the intermediate transfer unit 902 to the sheet. The sheet with the color image that is subjected to the fixing process is discharged toward the sheet discharge unit 96 that is formed in an upper part of the fixing unit 97 (inside the coupling housing 23).

The sheet discharge unit 96 then discharges the sheet, which is conveyed from the fixing unit 97, to an upper surface 213 of the lower housing 21 that is used as a sheet discharge tray.

<The Document Cover>

Figure 3:
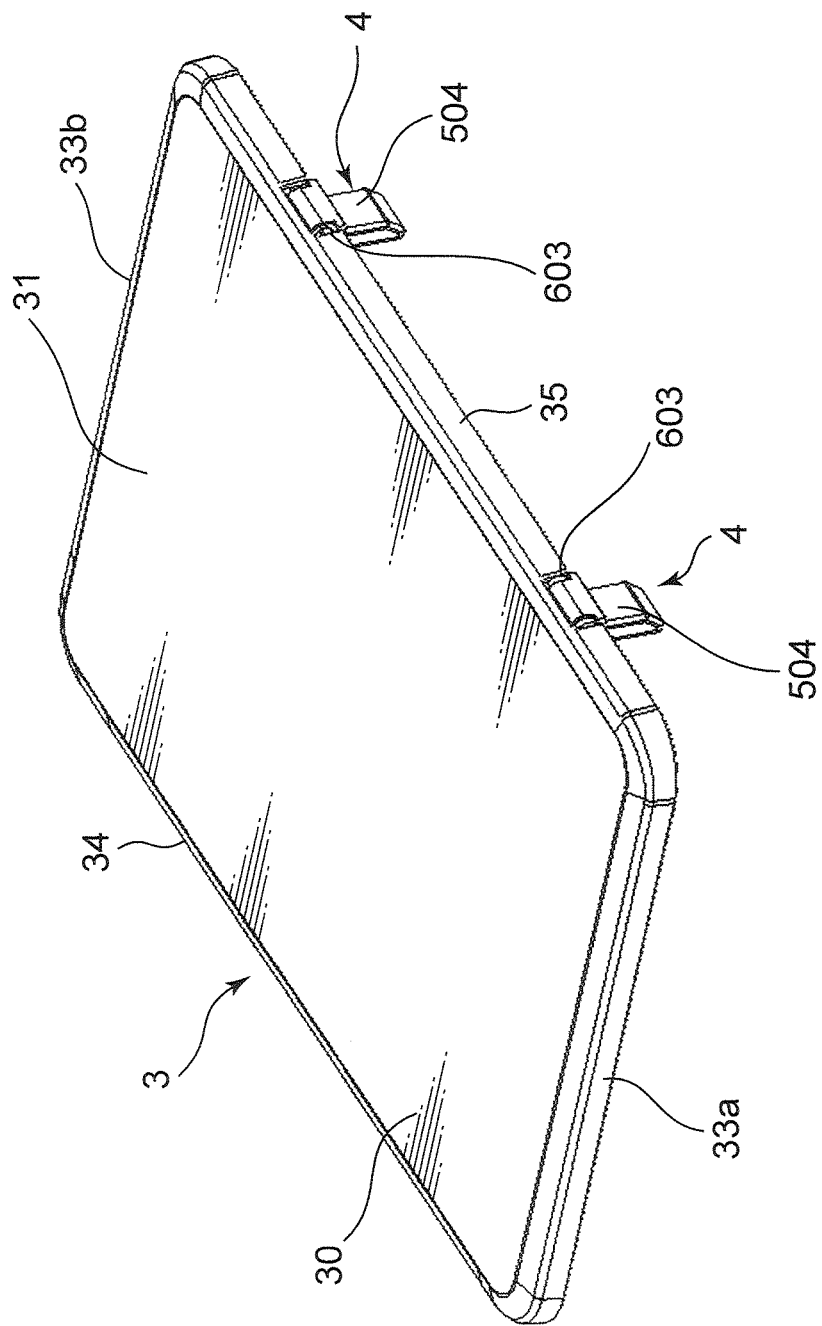
FIG. 3 is an upper perspective view of a document cover according to the embodiment of the present disclosure.
Figure 4:
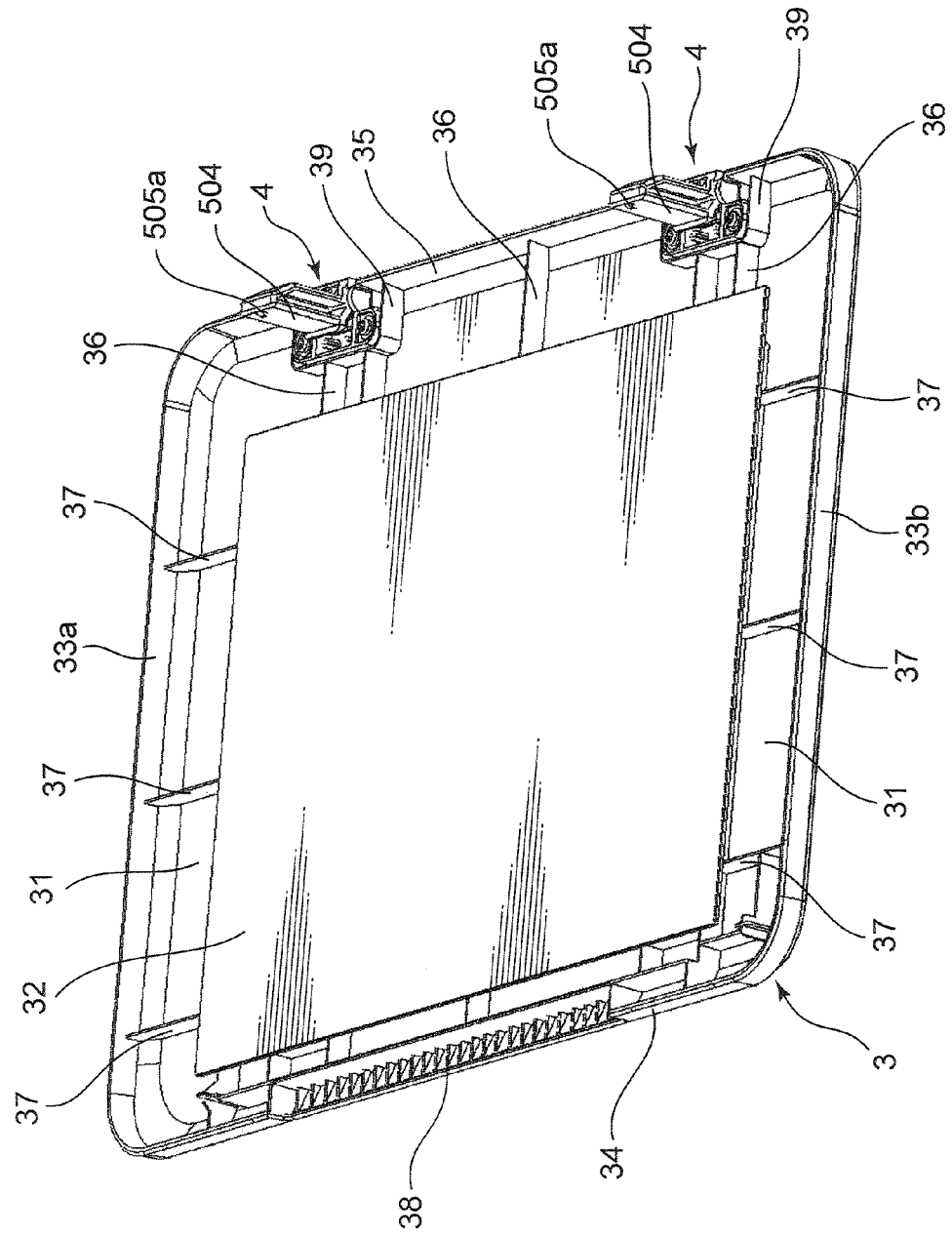
FIG. 4 is a lower perspective view of the document cover according to the embodiment of the present disclosure.
Figure 5:
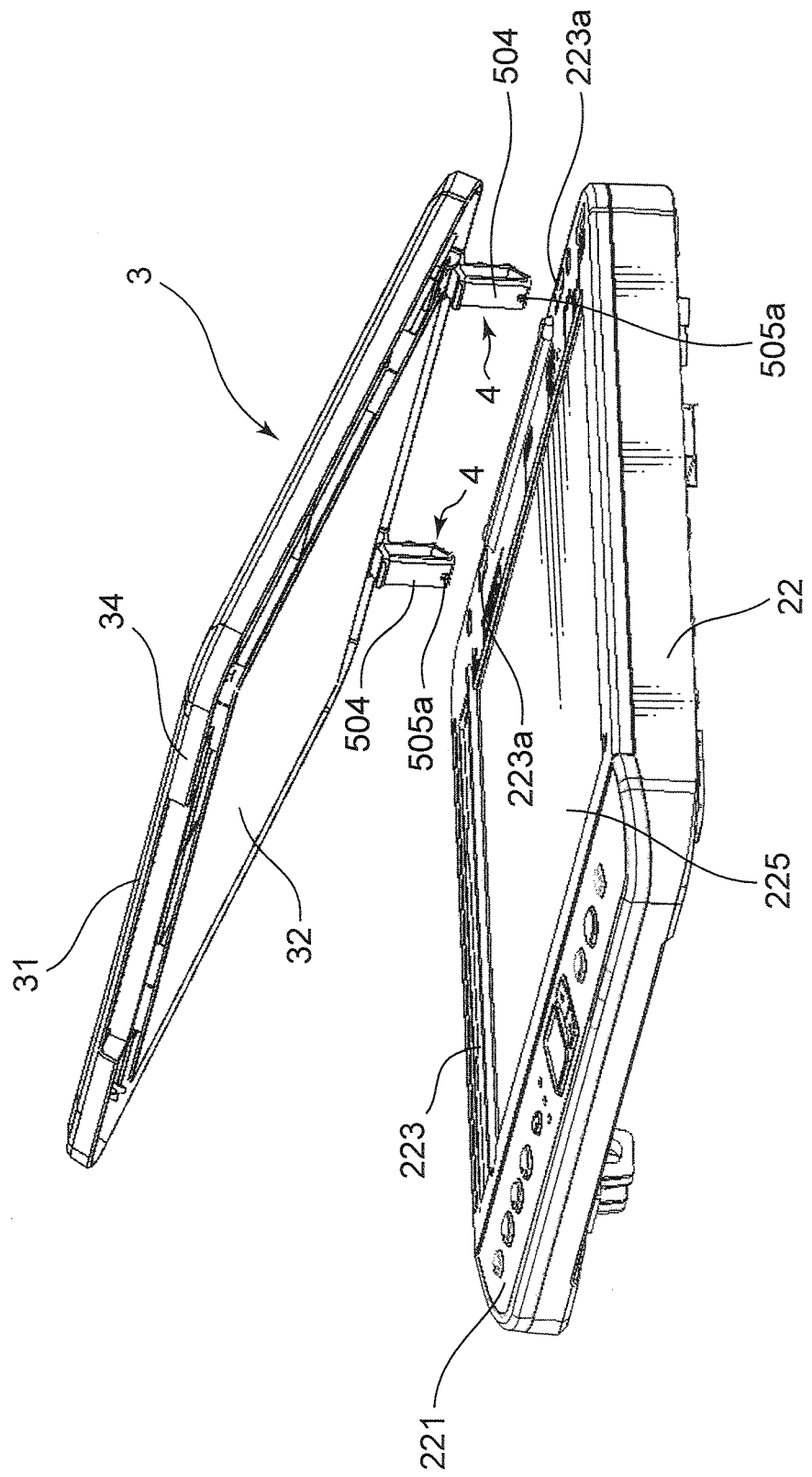
FIG. 5 is a perspective view showing how the document cover according to the embodiment of the present disclosure is attached to an upper housing.
Figure 6:
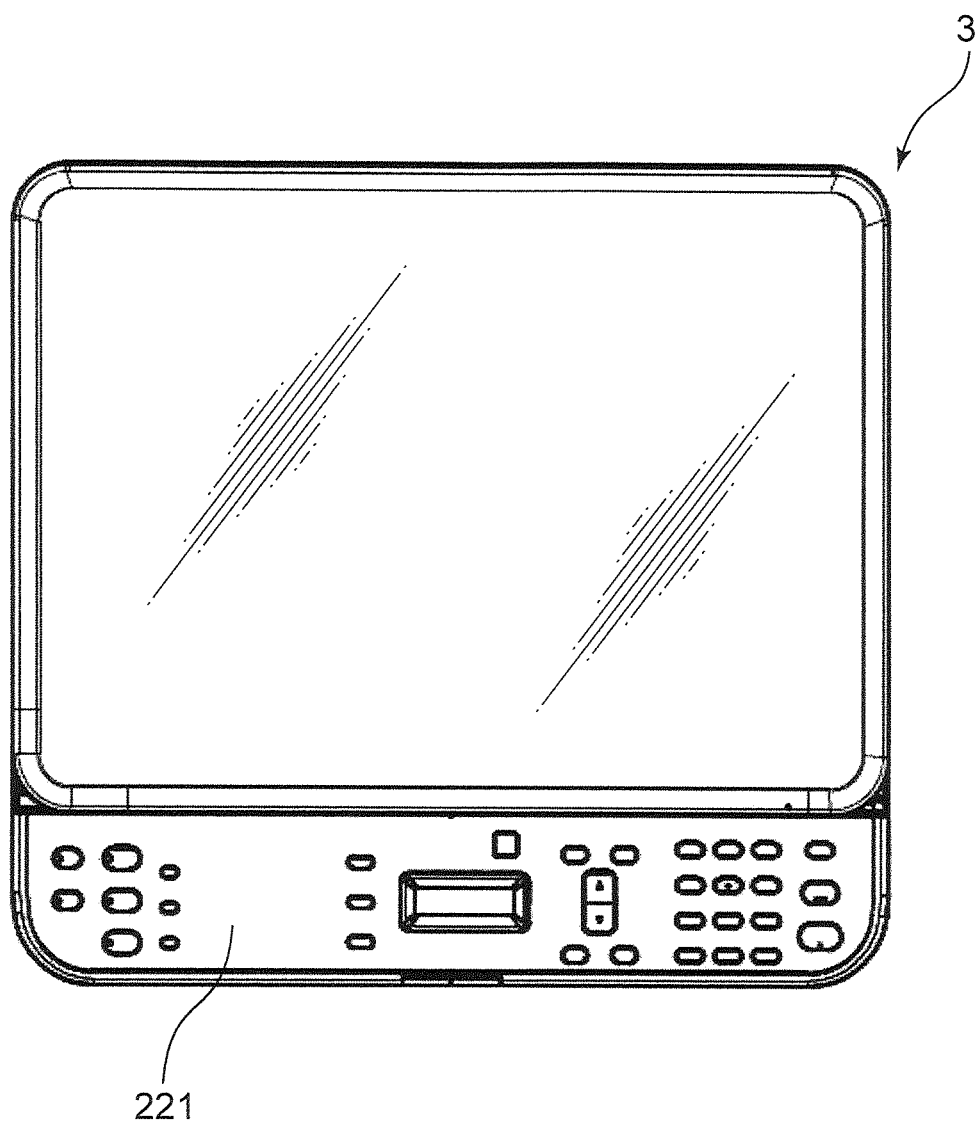
FIG. 6 is a plan view showing how the document cover according to the embodiment of the present disclosure is attached to the upper housing.

Next, the document cover 3 according to the present embodiment is described with reference to FIGS. 3 to 6. FIG. 3 is a perspective view of the document cover 3 alone. FIG. 4 is a perspective view showing the back (lower surface) of the document cover 3. FIG. 5 is a perspective view showing how the document cover 3 according to the present embodiment is attached to the upper housing 22. FIG. 6 is a plan view showing a state in which the document cover 3 is attached to the upper housing 22.

The document cover 3 has a cover frame 30, a mat 32, and hinges 4. The cover frame 30 has a flat top plate 31, as well as a front rim 34, a rear rim 35, and a pair of side rims 33a and 33b that stand upright on the four sides of the top plate 31. As shown in FIG. 4, vertical ribs 36, horizontal ribs 37, and grippers 38 are disposed on the back of the cover frame 30.

The vertical ribs 36 are a plurality of rib members that are disposed between the front rim 34 and the rear rim 35 on the back of the top plate 31. Similarly, the horizontal ribs 37 are a plurality of rib members that are disposed between the pair of side rims 33a and 33b on the back of the top plate 31. Disposing the vertical ribs 36 and the horizontal ribs 37 in a manner as to intersect with each other on the back of the top plate 31 can ensure rigidity of the flat cover frame 30.

The mat 32 (document pressing part) functions to press the document on the contact glass 225 (document platen) when the document cover 3 is attached to the upper housing 22 (housing). The mat 32, formed from a flat elastic member, is disposed in a central part on the back of the document cover 3. The area of the mat 32 is slightly smaller than that of the top plate 31. The mat 32 is adhered to the plurality of vertical ribs 36 and horizontal ribs 37 that intersect with each other.

The pair of hinges 4 is disposed along the rear rim 35 on the back of the top plate 31. The hinges 4 are separated from each other. The pair of hinges 4 is shifted from a central part of the rear rim 35 toward the side rims 33a and 33b. The hinges 4 project from the cover frame 30 and have arm parts 504 capable of turning around shaft parts 603 (FIG. 3) with respect to the top plate 31. As shown in FIG. 5, the arm parts 504 (second fixed parts) of the hinges 4 are inserted into a pair of slots 223a that are disposed on an upper surface frame 223 of the upper housing 22 and at the back side of the contact glass 225. Consequently, the document cover 3 and the upper housing 22 are fixed. While being supported by the hinges 4, the document cover 3 turns around the shaft parts 603 such that the front rim 34 moves vertically. This turning motion of the document cover 3 can open the front side of the contact glass 225, allowing the user to place the document on the contact glass 225.

<The Structure of the Hinges 4>

Figure 7:
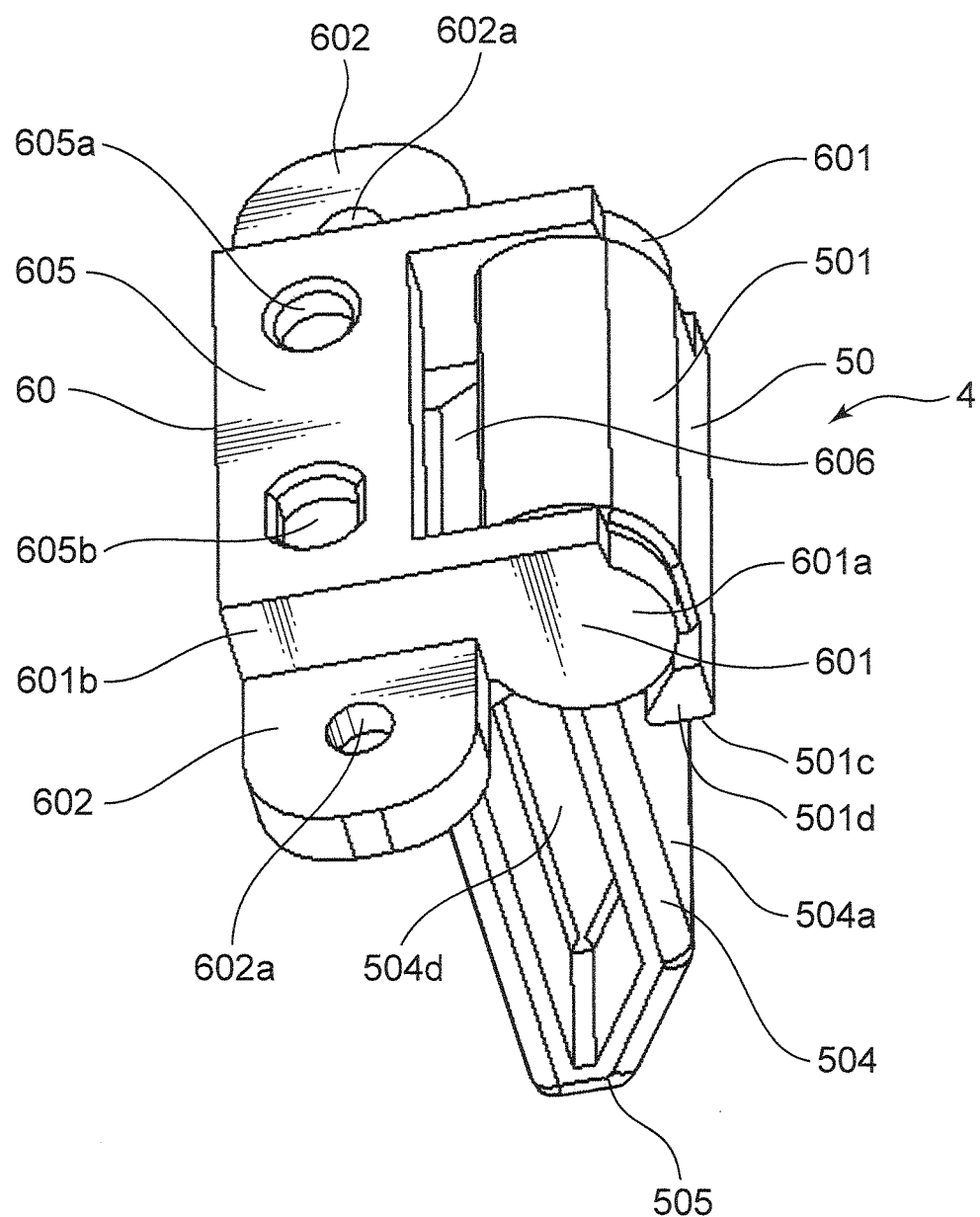
FIG. 7 is a perspective view of a hinge according to the embodiment of the present disclosure.
Figure 8:
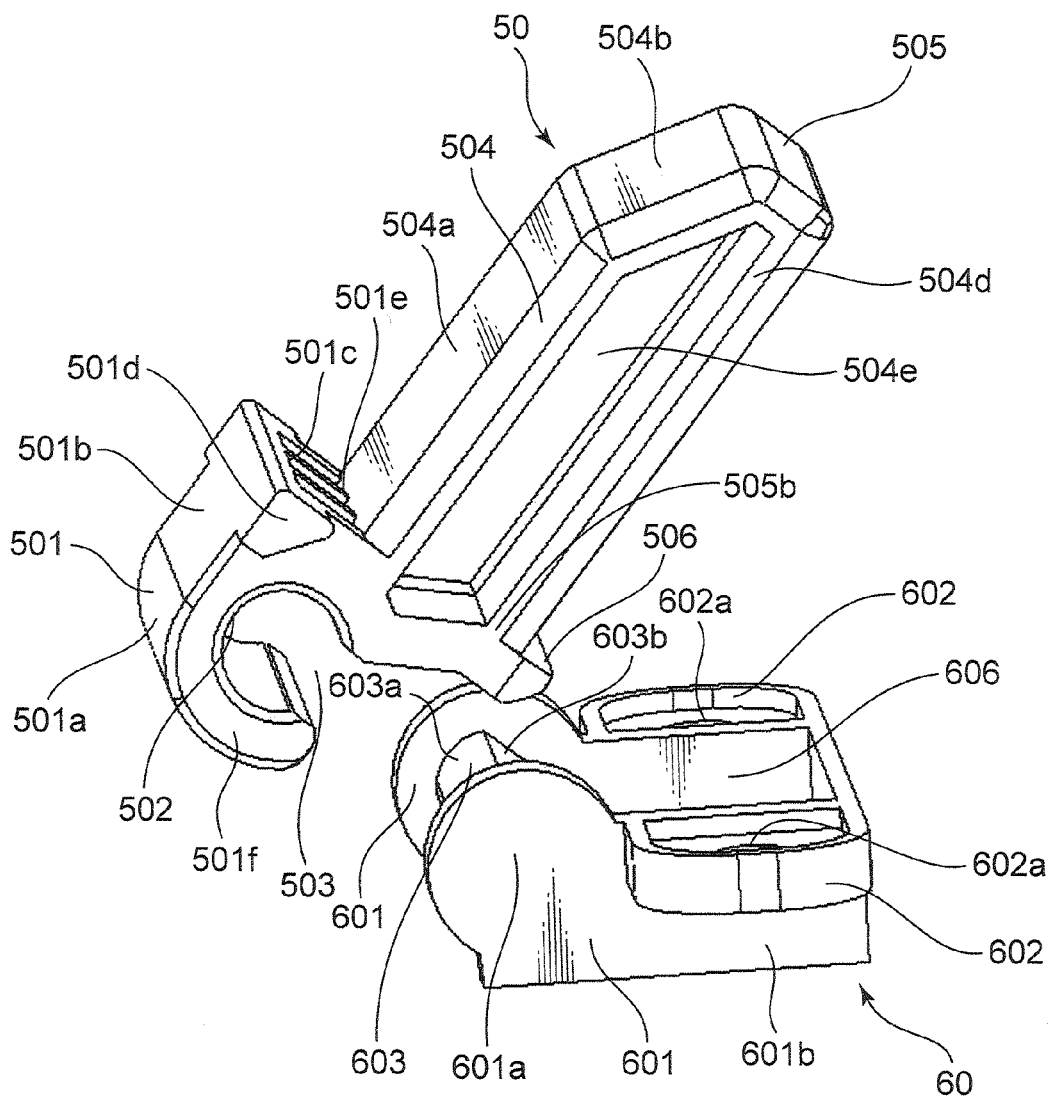
FIG. 8 is a perspective view showing a structure of the hinge according to the embodiment of the present disclosure.
Figure 9:
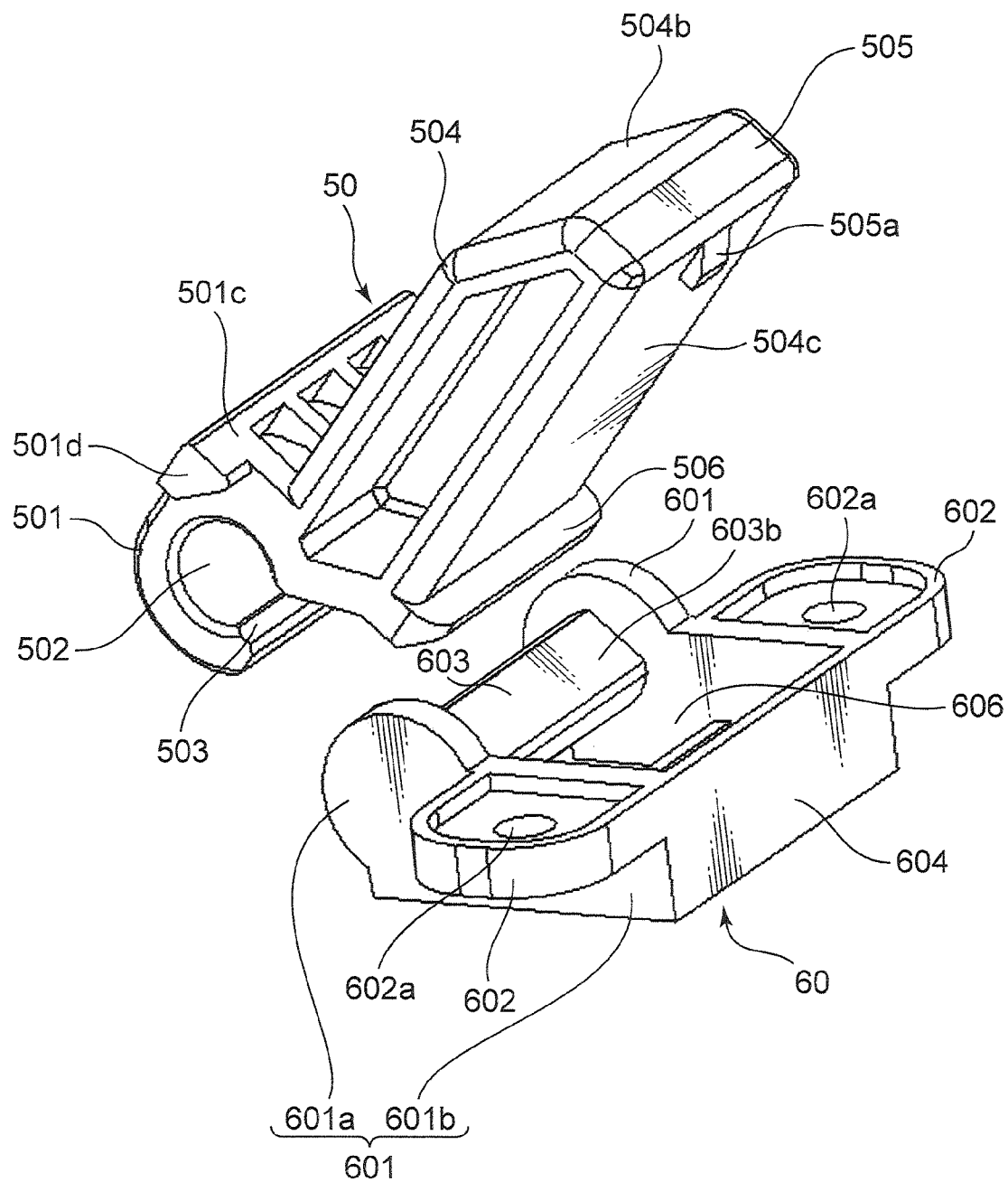
FIG. 9 is a perspective view showing the structure of the hinge according to the embodiment of the present disclosure.

Next, the structure of the hinges 4 according to the present embodiment is described with reference to FIGS. 7 to 9. Each of the hinges 4 is configured by a pillar member 50 (second member) fixed to the upper housing 22, and a shaft member 60 (first member) fixed to the cover frame 30. FIG. 7 is an upper perspective view of substantially the same situation in which each hinge 4 is attached to the document cover 3. FIGS. 8 and 9 are each a perspective view of a state in which the hinge 4 shown in FIG. 7 is reversed vertically and then the pillar member 50 and the shaft member 60 are separated from each other. FIGS. 8 and 9 are diagrams in which the hinge is viewed in horizontal directions different from each other.

The pillar member 50 has a cylinder part 501 in the form of substantially a cylinder, which has a C-shaped cross section, and the arm part 504 (second fixed part) that projects in one direction from a circumferential surface of the cylinder part 501.

The cylinder part 501 functions to allow the pillar member 50 to be fitted to the shaft member 60. The cylinder part 501 is defined by an outer peripheral part 501a, supporting part 502 (fitted part), cutout part 503 (cutout part), and a pair of side walls 501f. The outer peripheral part 501a configures an outer circumferential surface of the cylinder part 501, and the supporting part 502 configures an inner circumferential surface of the cylinder part 501. The cutout part 503 is formed by cutting a part of the supporting part 502 in a circumferential direction along an axial direction of the cylinder part 501. The cutout part 503 is an opening that opens an annular space of the supporting part 502. The pair of side walls 501f is provided at either end of a cylinder axial direction so as to couple the outer peripheral part 501a and the supporting part 502. When the pillar member 50 and the shaft member 60 are assembled, the supporting part 502 is supported by the shaft part 603 of the shaft member 60. The cutout part 503 is fitted to beveled parts 603b of the shaft member 60.

Furthermore, a flat end surface 501b is formed at a part of the outer peripheral part 501a of the cylinder part 501. The flat end surface 501b is formed by stretching a part of the periphery of the outer peripheral part 501a in a tangential direction, as viewed from a cross section perpendicular to a cylindrical axis. A tip end of the flat end surface 501b is provided with an abutting surface 501c that is disposed perpendicular to the flat end surface 501b, and a perpendicular part 501d is formed by the intersection between the flat end surface 501b and the abutting surface 501c. The perpendicular part 501d protrudes from the side walls 501f slightly to the outside in the direction of the cylindrical axis. When the pillar member 50 is mounted on the upper housing 22, the abutting surface 501c abuts on the upper surface frame 223.

The arm part 504, a member in the shape of a substantially polygonal pillar, is connected to the cylinder part 501 and mounted on the upper housing 22. The arm part 504 is defined by a first insertion surface 504a, an inclined part 504b, a second insertion surface 504c (FIG. 9), a tip end part 505, a pair of side wall ribs 504d, and a pair of concave parts 504e. The arm part 504 also has a stopper 505a and a regulating part 506.

The first insertion surface 504a is stretched from an end part 501e of the abutting surface 501c so as to be perpendicular to the abutting surface 501c. The inclined part 504b is inclined and connected to a tip end of the first insertion surface 504a. The second insertion surface 504c (FIG. 9) is provided on the other side of the inclined part 504b and the first insertion surface 504a and stretched parallel to the first insertion surface 504a. The tip end part 505 connects the inclined part 504b and the second insertion surface 504c, on the tip end side of the arm part 504. The pair of side wall ribs 504d are rib-shaped sections disposed on side surfaces of the arm part 504 along the first insertion surface 504a, the inclined part 504b, the tip end part 505, and the second insertion surface 504c. The pair of concave parts 504e are resin-molded cavity parts with end surfaces caved in, and are surrounded by the side wall ribs 504d.

The stopper 505a is provided near the tip end part 505 of the second insertion surface 504a in a manner as to protrude at a width direction central part of the second insertion surface 504c. The stopper 505a is in a trapezoidal shape when viewed from a cross section perpendicular to the cylindrical axis of the cylinder part 501, and is provided with a tapered surface that is inclined toward the tip end part 505. The stopper 505a functions to prevent the pillar member 50 from falling off the upper housing 22.

The regulating part 506 (protruding part) is provided on the opposite side to the stopper 505a of the second insertion surface 504c (at a base end part 505b of the arm part 504), in a protruding manner so as to be perpendicular to a direction in which the second insertion surface 504c extends. The regulating part 506 is disposed over the entire area in the width direction of the second insertion surface 504c. The regulating part 506 functions to prevent the pillar member 50 and the shaft member 60 from being detached from each other when the hinge 4 is mounted on the frame cover 30.

The shaft member 60 has the shaft part 603 (rotating shaft), a pair of flat pivot plates 601, a coupling plate 604 that connects the pair of pivot plates 601, a bottom plate 605 (supporting plate) that similarly connects the pair of pivot plates 601, and fastening parts 602 (first fixed parts) protruding from the pivot plates 601 respectively.

The shaft part 603 has substantially a tubular shape. A circumferential surface thereof has the pair of beveled parts 603b formed along the axial direction, and a pair of round parts 603a (FIG. 8) that connects the pair of beveled parts 603b and are formed from the circumferential surface of the tube. Note that the length of the minimum outer diameter part of the shaft part 603 that is formed by the pair of beveled parts 603b is set to be slightly shorter than a cross-sectional cutout width of the cutout part 503 of the pillar member 50 that is perpendicular to the cylindrical axis. The shaft member 603 is a rotating shaft center that supports the supporting part 502 of the pillar member 50 and allows the pillar member 50 to rotate therearound.

The pair of pivot plates 601 is a pair of plate-like members disposed facing each other at either end of the shaft part 603. Each of the pivot plates 601 has a disk-shaped pivot surface 601a having a diameter larger than that of a cross-sectional circular shape of the shaft part 603, and a substantially rectangular fastening supporting surface 601b connected to the pivot surface 601a (FIG. 8).

The coupling plate 604 (FIG. 9) is a plate-like member for coupling the pair of pivot plates 601 by means of a pair of sides of the fastening supporting surfaces 601b, and is disposed facing the shaft part 603. The bottom plate 605 (FIG. 7) is a plate-like member disposed perpendicular to the coupling plate 604 to connect the pair of pivot plates 601. The bottom plate 605 has a hole 605a and long hole 605b penetrating through two sections along the axial direction of the shaft part 603.

The pair of fastening parts 602 are plate-like members that extend from the pair of fastening supporting surfaces 601b, respectively, to the outside of the shaft part 603 in the axial direction. The fastening parts 602 are disposed so as to form a predetermined size of steps with the bottom plate 605. In other words, in FIG. 7 that shows substantially the same situation in which the hinge 4 is attached to the document cover 3, the bottom plate 605 is disposed in an upward protruding manner so as to form the steps with the pair of fastening parts 602. The pair of fastening parts 602 has substantially a U-shape. A central part of each fastening part 602 is provided with a fastener hole 602a penetrating through the plate-like member.

A movable space 606 that stores a part of the pillar member 50 as the pillar member 50 rotates, is formed in a region surrounded by the pair of pivot plates 601, the shaft part 603, the coupling plate 604, and the bottom plate 605.

<Assembling the Hinge 4>

Figure 10:
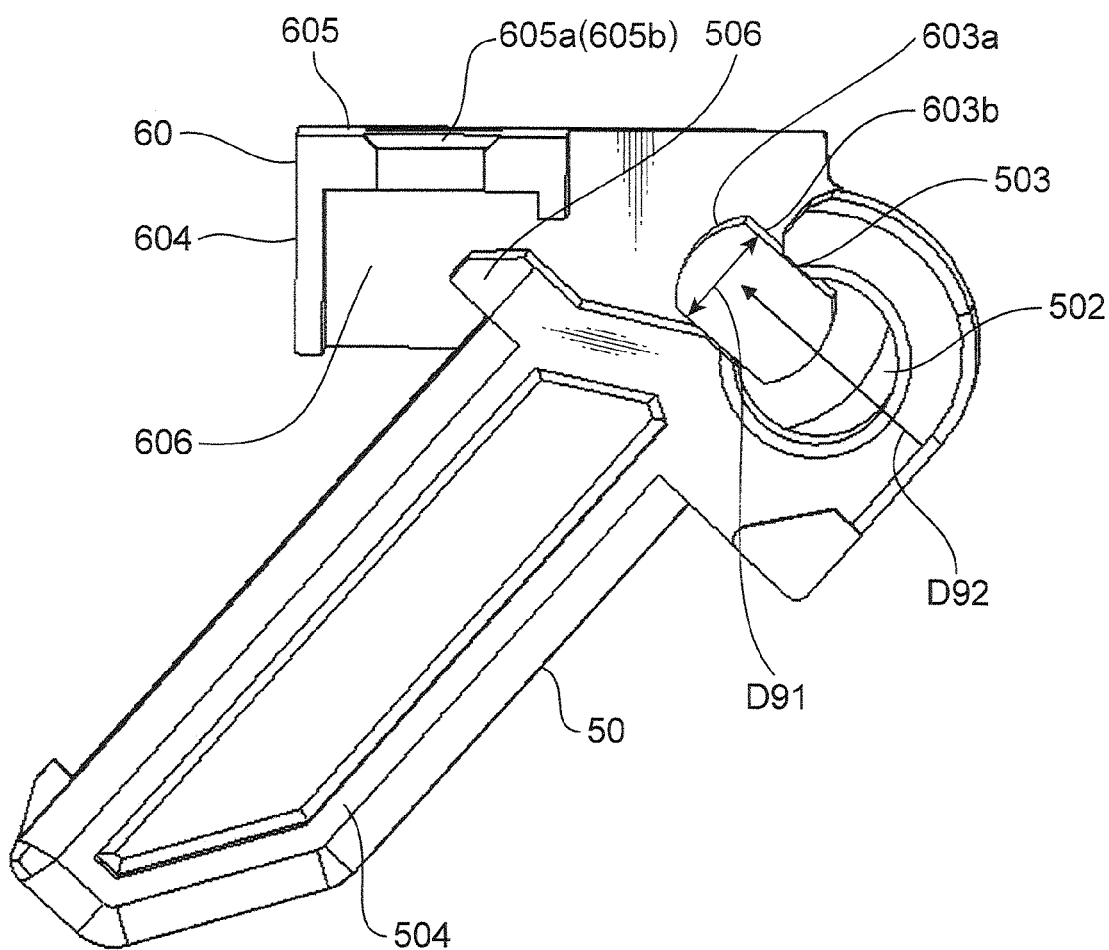
FIG. 10 is a cross-sectional diagram of the hinge according to the embodiment of the present disclosure.

Next, an assembly structure of each hinge 4 according to the present embodiment is described with reference to FIGS. 9 to 11. In order to join the pillar member 50 and the shaft member 60 to each other to assemble the hinge 4, the cutout part 503 of the pillar member 50 and the round parts 603a of the shaft member 60 are positioned so as to face each other in parallel in the axial direction, as shown in FIG. 9. FIG. 10 is a cross-sectional diagram showing this situation in which the shaft member 60 and the pillar member 50 are bonded to each other. While the cutout part 503 of the pillar member 50 is rubbed against a small diameter part D91 formed between the pair of beveled parts 603b of the shaft member 60, the pillar member 50 is inserted in a direction of an arrow D92. In so doing, the regulating part 506 of the pillar member 50 enters the movable space 606 of the shaft member 60.

Figure 11:
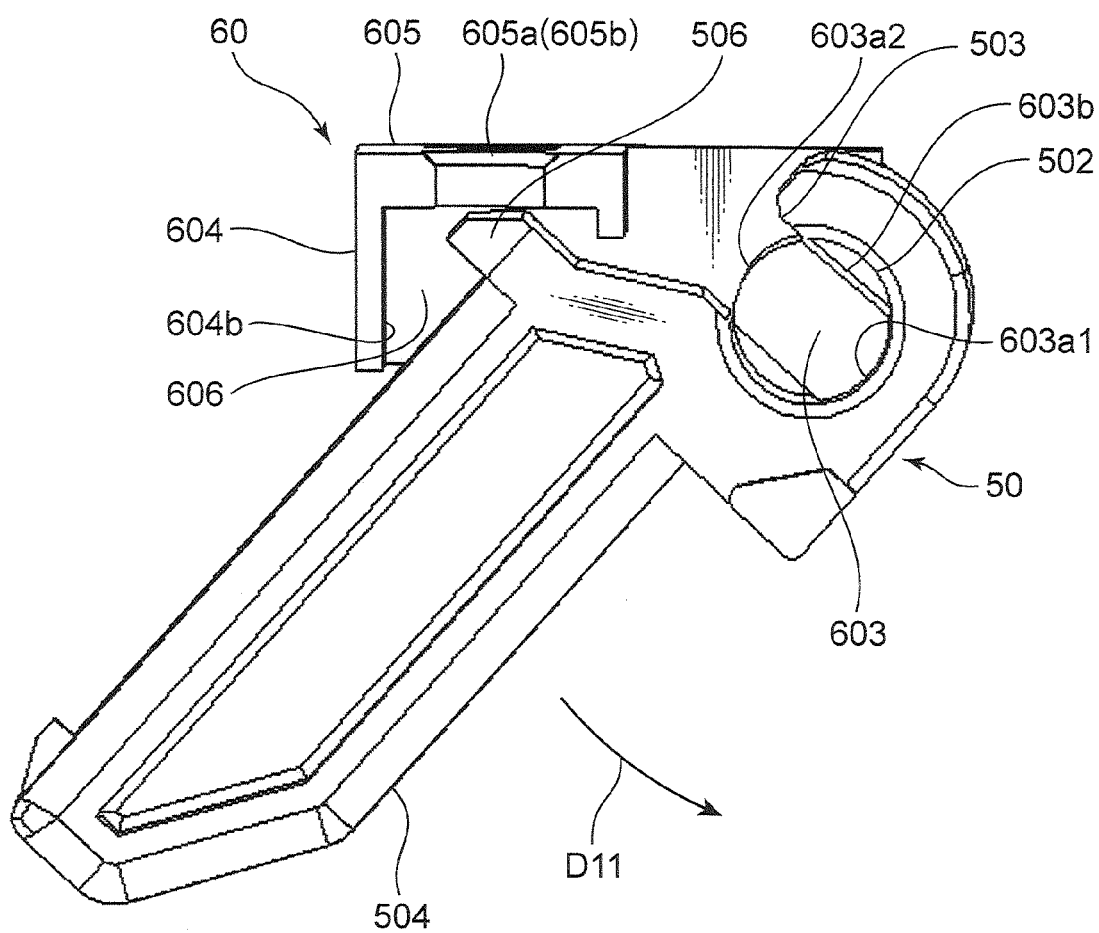
FIG. 11 is a cross-sectional diagram of the hinge according to the embodiment of the present disclosure.

Moreover, as a result of continuing to insert the cutout part 503, an inner circumferential surface of the supporting part 502 of the pillar member 50 is brought into abutment with one of the round parts 603a1 of the shaft part 603, as shown in FIG. 11. At the same time, the other round part 603a2 is placed inside the circumference of the supporting part 502. As a result, the shaft part 603 is stored in the supporting part 502. The regulating part 506 that enters the movable space 606 stops at a position facing the hole 605a (long hole 605b) formed in the bottom plate 605.

Then, by rotating the pillar member 50 as shown by an arrow D11 of FIG. 11, the round part 603a2 of the shaft member 60 rotates to separate from the cutout part 503. In other words, because the small diameter part D91 (FIG. 10) facing the cutout part 503 is shifted in the circumferential direction, the pillar member 50 is coupled to the shaft member 60 without falling off. Furthermore, the regulating part 506 retracts from the movable space 606 while facing an inner wall tip end 604b of the coupling plate 604. As a result, the hinge 4 shown in FIG. 7 is completed (first state).

<Attaching the Hinges 4>

Figure 12:
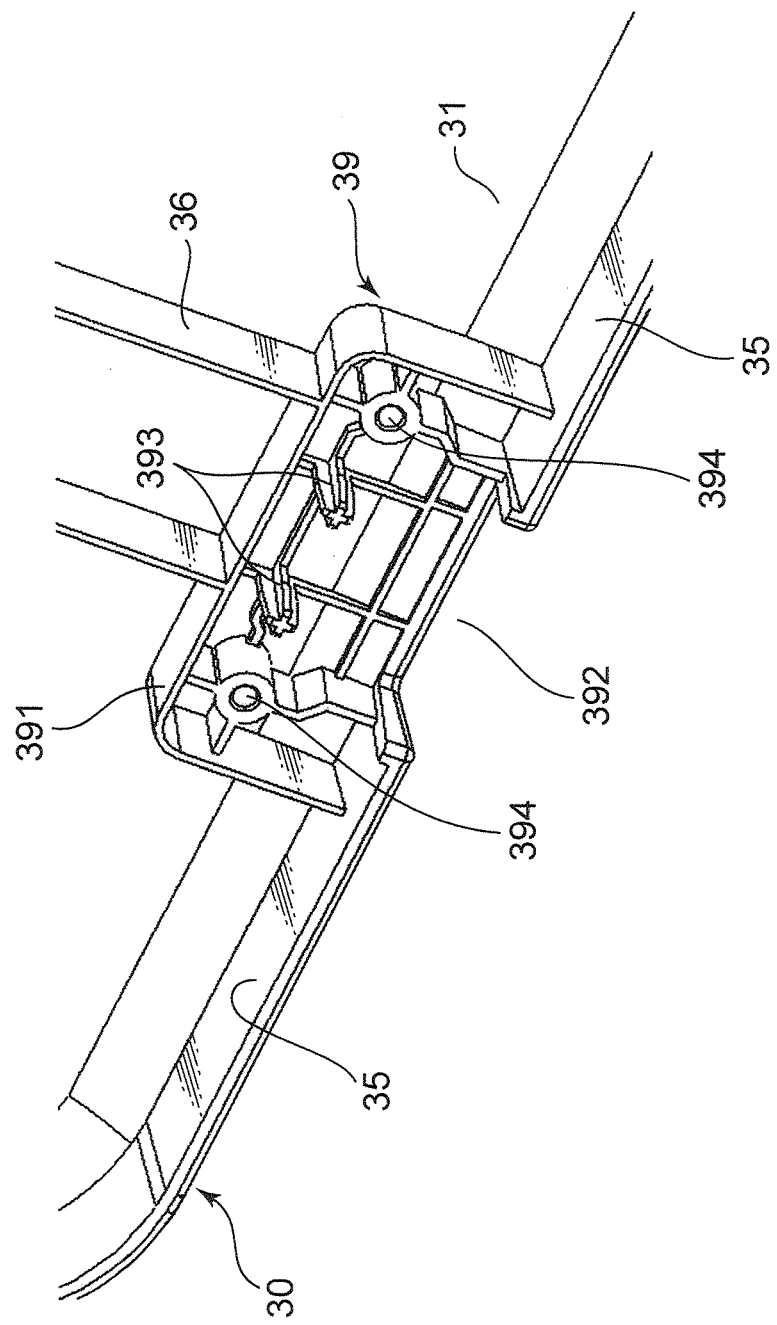
FIG. 12 is an enlarged perspective view of the document cover according to the embodiment of the present disclosure.

Next, a structure of attaching each hinge 4 according to the present embodiment to the cover frame 30 is described with reference to FIGS. 12 to 14. As shown in FIG. 12, the cover frame 30 is provided with an attachment part 39 at a position to which the hinge 4 is attached. The attachment part 39 is disposed inside the rear rim 35 on the back of the top plate 31. The attachment part 39 has an inverted C-shaped storage rim 391 that forms a storage space along with the rear rim 35, a retracting part 392 facing the storage rim 391 and formed by cutting a part of the rear rim 35, a pair of screw hole parts 394 disposed so as to protrude to the inside of the storage rim 391 on the back of the top plate 31, and a pair of studs 393 provided inward of the pair of screw hole parts 394 and protruding from the back of the top plate 31.

Figure 13:
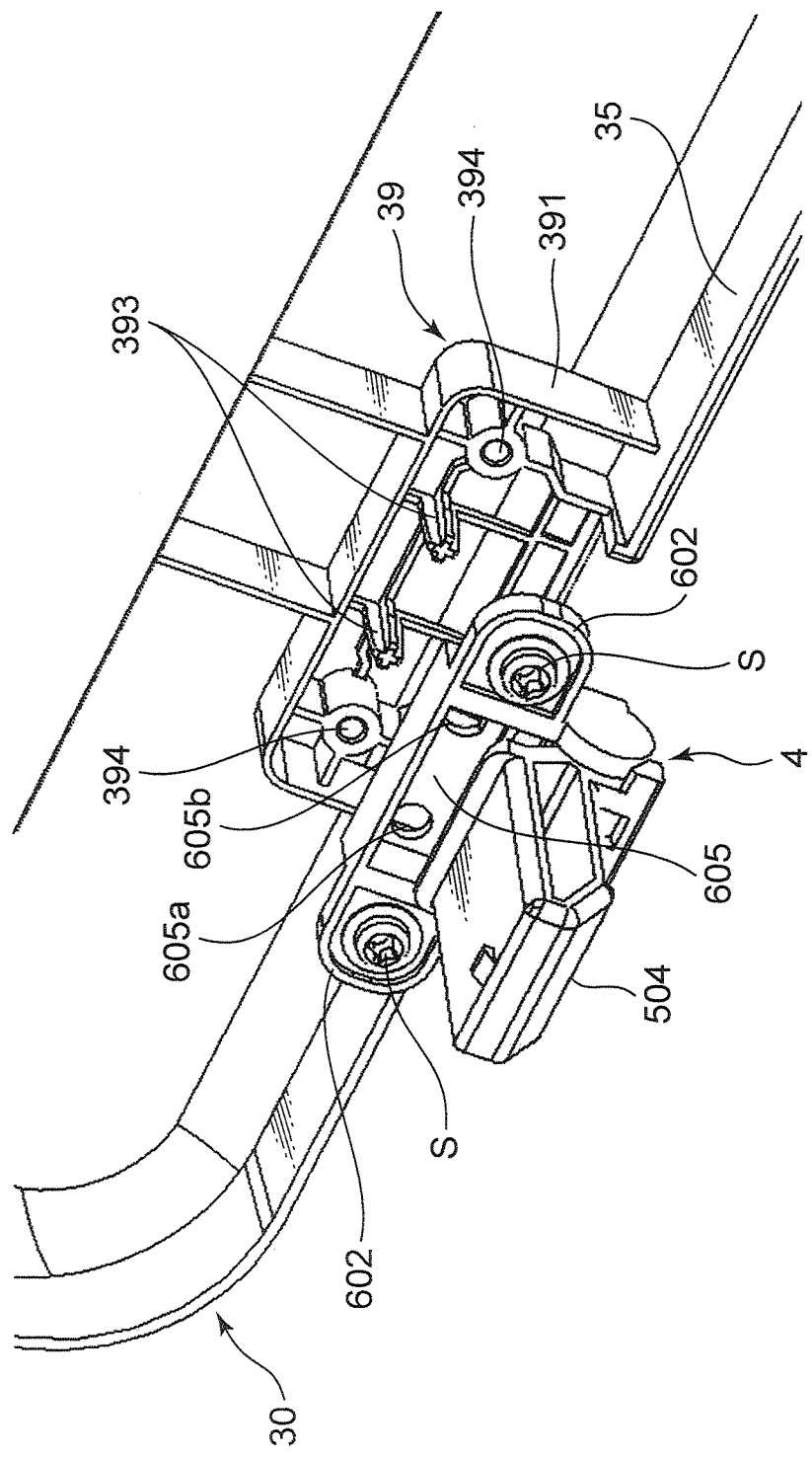
FIG. 13 is an enlarged perspective view showing a structure of the document cover according to the embodiment of the present disclosure.
Figure 14:
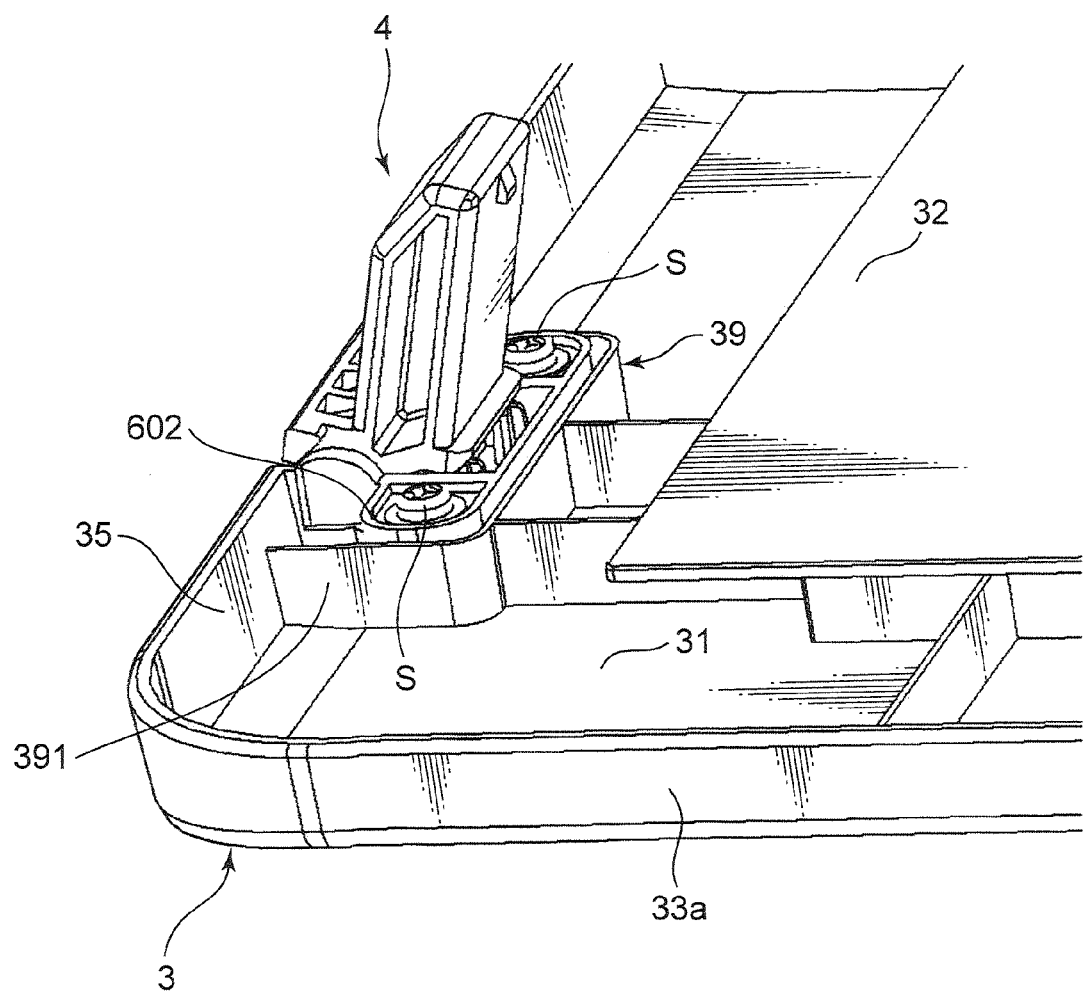
FIG. 14 is an enlarged perspective view of the document cover according to the embodiment of the present disclosure.

As shown in FIGS. 13 and 14, the hinge 4, assembled beforehand, is incorporated to the attachment part 39. In the hinge 4, screws S are inserted into the pair of fastener holes 602a of the shaft member 60 (FIG. 7), and these screws S are fastened to the screw hole parts 394 of the attachment part 39. The pair of studs 393 of the attachment part 39 are inserted to the hole 605a and the long hole 605b of the shaft member 60, respectively. The bottom plate 605 and part of the fastening parts 602 of the shaft member 60 are stored in the space between the storage rim 391 and the rear rim 35.

<Operations of the Hinges 4>

Figure 15:
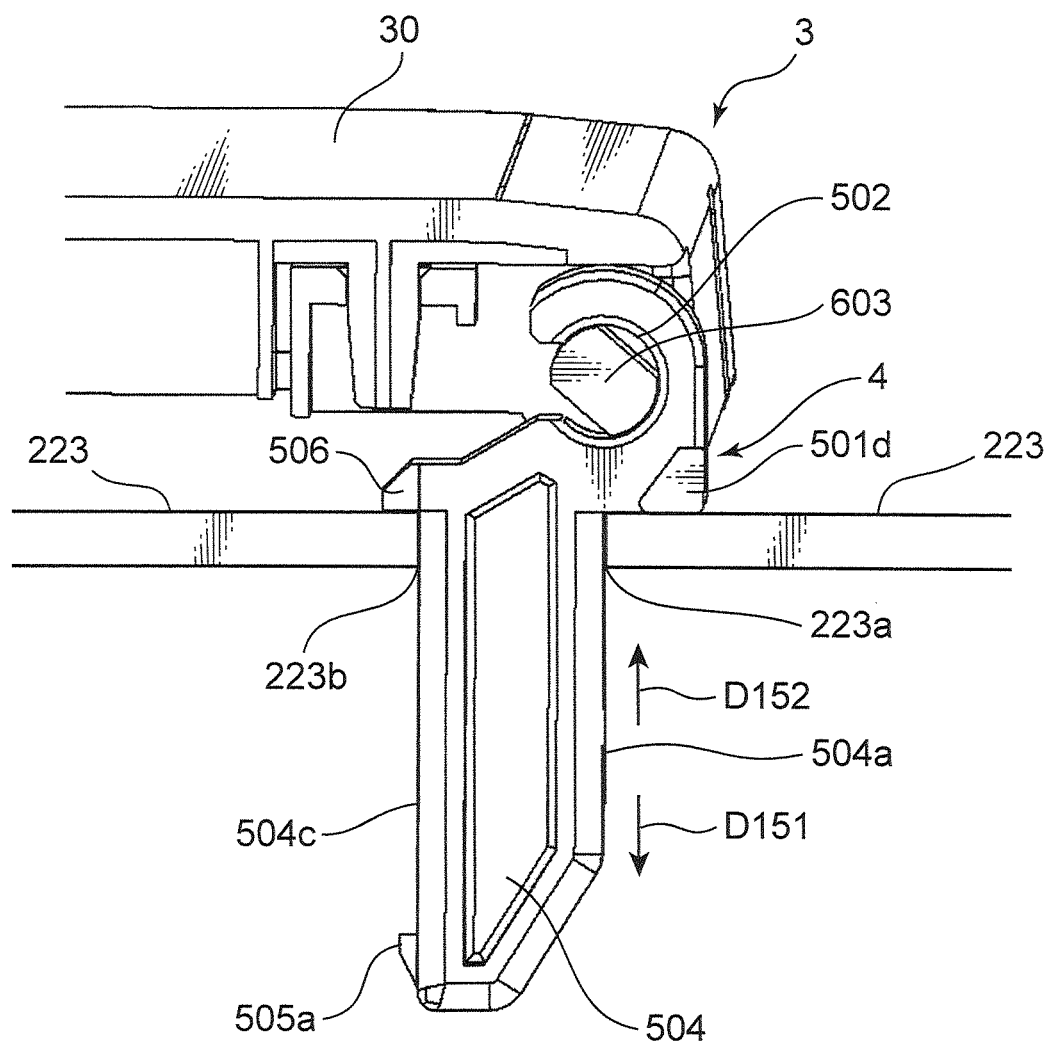
FIG. 15 is an enlarged cross-sectional diagram of the document cover according to the embodiment of the present disclosure.
Figure 16:
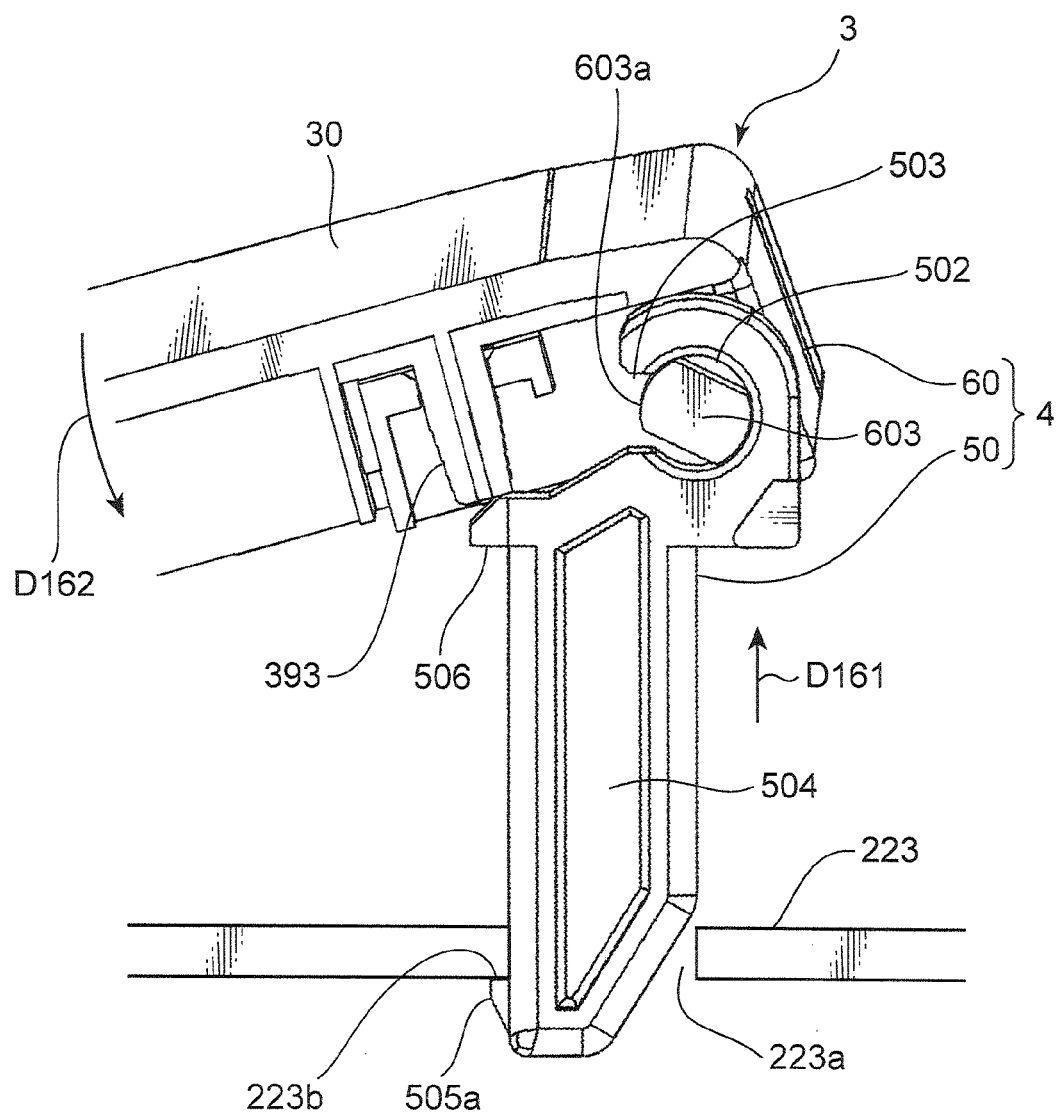
FIG. 16 is an enlarged cross-sectional diagram of the document cover according to the embodiment of the present disclosure.

Next, operations of each hinge 4 according to the present embodiment are described with reference to FIGS. 15 and 16. FIG. 15 is an enlarged cross-sectional diagram showing a state in which the document cover 3 attached with the hinge 4 is attached to the upper housing 22. FIG. 16 is an enlarged cross-sectional diagram showing the periphery of the hinge 4 in a state where a book document is placed on the contact glass 225.

When attaching the document cover 3 to the upper housing 22, the arm part 504 is inserted (an arrow D151) into the slot 223a disposed in the upper surface frame 223 (see FIG. 5), as shown in FIG. 15. In so doing, an opened width of the slot 223a is set in accordance with an interval between the first insertion surface 504a and the second insertion surface 504c of the arm part 504. Therefore, the stopper 505a that is provided at the tip end of the second insertion surface 504c in a protruding manner is inserted into the slot 223a while being rubbed against an inner wall of the slot 223a. When the perpendicular part 501d and the regulating part 506 that protrude from the base end part 505b of the arm part 504 in opposite directions are brought into abutment with a surface of the upper surface frame 223, the insertion of the arm part 504 is stopped. Note that because the arm part 504 can slide upward via the slot 223a, the document cover 3 can move vertically within a predetermined range.

Figure 17:
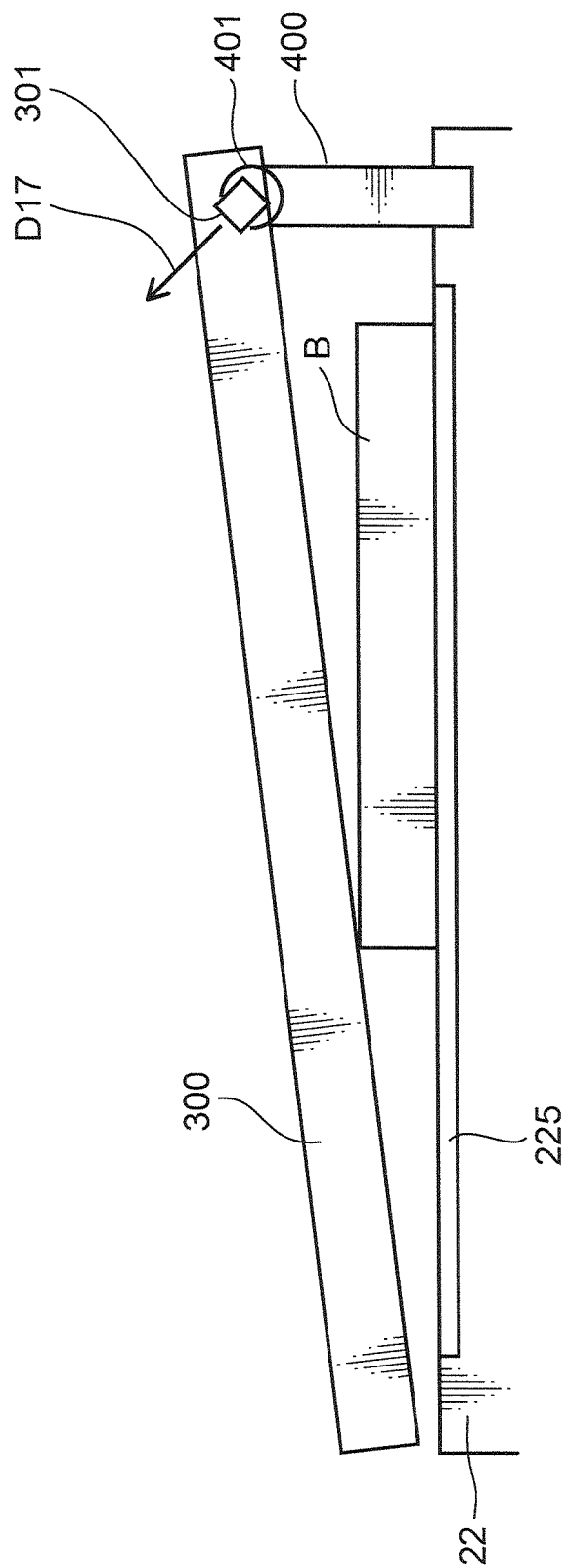
FIG. 17 is a cross-sectional diagram schematically showing a conventional document cover.

When the book document B or the like with a predetermined thickness is placed on the contact glass 225 in the state in which the document cover 3 is attached to the upper housing 22 (see FIG. 17), the user presses down a front surface of the document cover 3 so that light outside the machine does not enter the contact glass 225. As a result, the near side (left-hand side in the diagram) of the document cover 3 is pulled downward, while the rear side (near the hinge 4) of the same is pulled upward (arrows D161 and D162), as shown in FIG. 16. In this case, the upward movement of the arm part 504 is stopped by the abutment of the stopper 505a against an inner end part 223b of the upper surface frame 223.

As described above, even when the cover frame 30 and the arm part 504 of the document cover 3 form an acute angle therebetween, the studs 393 protruding from the cover frame 30 come into abutment with the regulating part 506 protruding from the base end part 505b of the arm part 504. This prevents the cover frame 30 from further rotating (arrow D162). Therefore, relative rotation between the cover frame 30 and the pillar member 50, thereby the cutout part 503 of the pillar member 50 and the round parts 603a of the shaft member 60 to face each other, is disturbed, preventing the shaft part 603 from falling off the supporting part 502 (second state). Thus, the pillar member 50 is not removed from the shaft member 60, with the shaft member 60 remaining in the cover frame 30 after the document cover 3 is mounted on the upper housing 22. Because a part of each hinge 4 is prevented from falling off even when the book document B is placed on the contact glass 225, the book document B is not moved between the document cover 3 and the contact glass 225. Thus, the image on the book document B can be read stably by the scanning mechanism 224.

Additionally, in the present embodiment, when each hinge 4 is attached to the cover frame 30, the pair of studs 393 of the of the attachment part 39 are inserted to the hole 605a and the long hole 605b of the bottom plate 605 of the shaft member 60, respectively. As a result, the positions of the hole 605a and the long hole 605b are determined by the studs 393, stably maintaining the position of the shaft member 60 on the cover frame 30.

Moreover, in the present embodiment the regulating part 506 protrudes from the base end part 505b of each arm part 504. Therefore, even in a state in which the arm part 504 is inserted into the upper housing 22, the studs 393 can be brought into abutment with the regulating part 506, preventing the shaft member 60 and the pillar member 50 from being detached from each other. Also, because the regulating part 506 protrudes in a direction different from the direction in which the arm part 504 is stretched, the regulating part 506 can be brought into abutment with the upper surface frame 223, and the position where the insertion of the arm part 504 into the upper housing 22 is stopped can be determined.

In the present embodiment, when each of the hinges 4 is attached to the cover frame 30, the studs 393 of the cover frame 30 come into abutment with the regulating part 506 of the pillar member 50, preventing the pillar member 50 and the shaft member 60 from being detached from each other (second state). When, on the other hand, each of the hinges 4 is not attached to the cover frame 30, the regulating part 506 of the pillar member 50 can enter the movable space 606 of the shaft member 60 due to the absence of the studs 393 (FIG. 11). Consequently, the rotation of the pillar member 50 relative to the shaft member 60 is not regulated, and the cutout part 503 of the pillar member 50 and the beveled parts 603b of the shaft member 60 are fitted to each other, allowing the pillar member 50 and the shaft member 60 to be detached from each other (first state).

Therefore, in the present embodiment, after assembling the shaft member 60 and the pillar member 50 in the assembly stage, one of them can be attached to the cover frame 30. Once one of them is attached to the cover frame 30, the shaft member 60 and the pillar member 50 are not detached from each other. Thus, detachment between the shaft member 60 and the pillar member 50 and loss of one of them after installing each of the hinges 4 to the cover frame 30 can be prevented.

In the present embodiment, the engagement between the beveled parts 603b and the cutout part 503 can allow the shaft member 60 and the pillar member 50 to be attached to and detached from each other. Therefore, providing the beveled parts 603b and the cutout part 503 can realize a simple attachment/detachment mechanism of the cover frame 30 and the upper housing 22.

The above has described the document cover 3 with the hinges 4 and the image forming apparatus 1 according to the embodiment of the present disclosure; however, the present disclosure is not limited thereto. The following modifications, for example, can be made.

(1) In the embodiment described above, when configuring each hinge 4, the member (the shaft member 60) to be fixed to the cover frame 30 has the shaft part 603, and the member (the pillar member 50) to be inserted into the upper housing 22 has the cylinder part 501. However, the present disclosure is not limited to this configuration. In other words, the member to be fixed to the top plate 31 may have the cylinder part 501, and the member to be inserted into the upper housing 22 may have the shaft part 603. In this case as well, as a result of fitting the cutout part 503 disposed in the cylinder part 501 to the beveled parts 603b formed in the shaft part 603 with each other, each of the hinges 4 can be formed, and the document cover 3 can be supported openably/closably with respect to the contact glass 225.

(2) The embodiment has described the case in which each of the hinges 4 is attached to the document cover 3; however, the present disclosure is not limited to this case. For instance, each of the hinges 4 may be attached to an automatic document feeder (ADF) for placing a document and conveying the document automatically to a document reading position.

(3) The embodiment also has described the case in which the pair of studs 393 protruding from the cover frame 30 penetrate through the hole 605a and the long hole 605b disposed in the bottom plate 605 of the shaft member 60 and come into abutment with the regulating part 506 of the pillar member 50; however, the present disclosure is not limited to this case. In other words, without having the bottom plate 605 (the long hole 605a and the long hole 605b), the shaft member 60 may have a configuration in which the pair of pivot plates 601 are coupled to each other only by the coupling plate 604. In this case, each hinge 4 is mounted on the cover frame 30, and the pair of studs 393 protrudes into the space surrounded by the pair of pivot plates 601. Then, the studs 393 can be brought into abutment with the regulating part 506 directly as the pillar member 50 rotates around the shaft part 603. In this configuration as well, the pillar member 50 and the shaft member 60 are prevented from being detached from each other after the hinges 4 are mounted on the cover frame 30.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A document cover for covering a document platen of a housing, the document cover comprising:
  a cover frame;
  a document pressing part disposed in the cover frame; and
  a hinge that is disposed in the cover frame and supports the cover frame rotatably such that the document pressing part opens and closes with respect to the document platen,
  wherein the hinge includes:
  a first member that has a rotating shaft functioning as a rotating shaft center in the rotational motion of the cover frame, and a first fixed part that is mounted on the cover frame; and
  a second member that has a fitted part that is fitted rotatably to the rotating shaft, and a second fixed part mounted on a side of the housing opposite the first fixed part,
  the first member and the second member being capable of changing states thereof between a first state in which the first member and the second member can be attached to or detached from each other when the first fixed part is mounted on the cover frame, and a second state in which the first member and the second member are prevented from being detached from each other by fixing the first fixed part to the cover frame when the rotating shaft and the fitted part are fitted to each other, and wherein
  the cover frame has a projection that projects to face the second member, and the first member and the second member enter the second state as the second member rotates around the rotating shaft and accordingly the projection abuts on the second member.

2. The document cover according to claim 1, wherein
  the rotating shaft has a beveled part obtained by forming a bevel on a circumferential surface of the rotating shaft along an axial direction thereof,
  the fitted part has a cutout part that is formed so as to correspond to a minimum outer diameter part of the rotating shaft that is formed by the beveled part, in a cross-sectional view perpendicular to the rotating shaft, with the cutout part being disposed along the axial direction of the rotating shaft, and
  the first member and the second member enter the first state by allowing the beveled part to pass through the cutout part so that the rotating shaft is fitted into the fitted part.

3. The document cover according to claim 1, wherein
  the first member has:
  a pair of pivot plates for supporting either end of the rotating shaft;
  a supporting plate for connecting the pair of pivot plates in axial direction of the rotating shaft; and
  a hole part that is formed in the supporting plate so as to face the cover frame, and wherein
  when mounting the first fixed part onto the cover frame, a protruding part of the projection that protrudes through the hole part can be brought into abutment with the second member.

4. The document cover according to claim 1 wherein
  the second fixed part has a tip end part, a base end part, and a regulating part that protrudes from the base end part in a direction different from that of the tip end part, with this tip end part being inserted into the housing, and the projection being brought into abutment with the regulating part.

5. An image reader, comprising:
  a housing having a document platen;
  a document cover for covering the document platen; and
  a reading part for reading an image on a document placed on the document platen,
  wherein the document cover includes:
  a cover frame;
  a document pressing part disposed in the cover frame; and
  a hinge that is disposed in the cover frame and supports the cover frame rotatably such that the document pressing part opens and closes with respect to the document platen, and wherein
  the hinge includes:
  a first member that has a rotating shaft functioning as a rotating shaft center in the rotational motion of the cover frame, and a first fixed part that is mounted on the cover frame; and
  a second member that has a fitted part that is fitted rotatably to the rotating shaft, and a second fixed part mounted on a side of the housing opposite the first fixed part,
  the first member and the second member being capable of changing states thereof between a first state in which the first member and the second member can be attached to or detached from each other when the first fixed part is mounted on the cover frame, and a second state in which the first member and the second member are prevented from being detached from each other by fixing the first fixed part to the cover frame when the rotating shaft and the fitted part are fitted to each other, and wherein
  the cover frame has a projection that projects to face the second member, and the first member and the second member enter the second state as the second member rotates around the rotating shaft and accordingly the projection abuts on the second member.

6. The image reader according to claim 5, wherein
the rotating shaft has a beveled part obtained by forming a bevel on a circumferential surface of the rotating shaft along an axial direction thereof,
the fitted part has a cutout part that is formed so as to correspond to a minimum outer diameter part of the rotating shaft that is formed by the beveled part, in a cross-sectional view perpendicular to the rotating shaft, with the cutout part being disposed along the axial direction of the rotating shaft, and
the first member and the second member enter the first state by allowing the beveled part to pass through the cutout part so that the rotating shaft is fitted into the fitted part.

7. The image reader according to claim 5, wherein
the first member has:
a pair of pivot plates for supporting either end of the rotating shaft;
a supporting plate for connecting the pair of pivot plates in axial direction of the rotating shaft; and
a hole part that is formed in the supporting plate so as to face the cover frame, and wherein
when mounting the first fixed part onto the cover frame, a protruding part of the projection that protrudes through the hole part can be brought into abutment with the second member.

8. The image reader according to claim 5, wherein
the second fixed part has a tip end part, a base end part, and a regulating part that protrudes from the base end part in a direction different from that of the tip end part, with this tip end part being inserted into the housing, and the projection being brought into abutment with the regulating part.

9. An image forming apparatus, comprising:
a housing having a document platen;
a document cover for covering the document platen;
a reading part for reading an image on a document placed on the document platen; and
an image forming part for forming an image in accordance with the image on the document read by the reading part,
wherein the document cover includes:
a cover frame;
a document pressing part disposed in the cover frame; and
a hinge that is disposed in the cover frame and supports the cover frame rotatably such that the document pressing part opens and closes with respect to the document platen, and wherein
the hinge includes:
a first member that has a rotating shaft functioning as a rotating shaft center in the rotational motion of the cover frame, and a first fixed part that is mounted on the cover frame; and
a second member that has a fitted part that is fitted rotatably to the rotating shaft, and a second fixed part mounted on a side of the housing opposite the first fixed part,
the first member and the second member being capable of changing states thereof between a first state in which the first member and the second member can be attached to or detached from each other when the first fixed part is mounted on the cover frame, and a second state in which the first member and the second member are prevented from being detached from each other by fixing the first fixed part to the cover frame when the rotating shaft and the fitted part are fitted to each other and wherein
the cover frame has a projection that projects to face the second member, and
the first member and the second member enter the second state as the second member rotates around the rotating shaft and accordingly the projection abuts on the second member.

10. The image forming apparatus according to claim 9, wherein
the rotating shaft has a beveled part obtained by forming a bevel on a circumferential surface of the rotating shaft along an axial direction thereof,
the fitted part has a cutout part that is formed so as to correspond to a minimum outer diameter part of the rotating shaft that is formed by the beveled part, in a cross-sectional view perpendicular to the rotating shaft, with the cutout part being disposed along the axial direction of the rotating shaft, and
the first member and the second member enter the first state by allowing the beveled part to pass through the cutout part so that the rotating shaft is fitted into the fitted part.

11. The image forming apparatus according to claim 9, wherein
the first member has:
a pair of pivot plates for supporting either end of the rotating shaft;
a supporting plate for connecting the pair of pivot plates in axial direction of the rotating shaft; and
a hole part that is formed in the supporting plate so as to face the cover frame, and wherein
when mounting the first fixed part onto the cover frame, a protruding part of the projection that protrudes through the hole part can be brought into abutment with the second member.

12. The image forming apparatus according to claim 9, wherein
the second fixed part has a tip end part, a base end part, and a regulating part that protrudes from the base end part in a direction different from that of the tip end part, with this tip end part being inserted into the housing, and the projection is brought into abutment with the regulating part.

* * * * *